United States Patent [19]
Hashimoto et al.

[11] Patent Number: 5,962,154
[45] Date of Patent: Oct. 5, 1999

[54] MAGNETO-OPTICAL RECORDING MEDIUM EXCLUSIVELY FOR REPRODUCTION, METHOD OF MANUFACTURING THE SAME AND METHOD OF REPRODUCING INFORMATION FROM THE MEDIUM

[75] Inventors: Morimi Hashimoto, Wako; Tsutomu Shiratori, Tokyo, both of Japan

[73] Assignee: Canon Kabushiki Kaisha, Tokyo, Japan

[21] Appl. No.: 08/989,028

[22] Filed: Dec. 11, 1997

[30] Foreign Application Priority Data

Dec. 13, 1996 [JP] Japan .................................. 8-333756
Dec. 4, 1997 [JP] Japan .................................. 9-334565

[51] Int. Cl.$^6$ ........................................ G11B 5/66
[52] U.S. Cl. .................. 428/694 ML; 428/694 MM; 428/694 EC; 428/694 GR; 428/900; 369/13
[58] Field of Search ............... 428/694 ML, 694 MM, 428/694 EC, 694 GR, 900; 368/13

[56] References Cited

U.S. PATENT DOCUMENTS

| | | | |
|---|---|---|---|
| 4,756,967 | 7/1988 | Hashimoto, et al. | 428/336 |
| 4,910,068 | 3/1990 | Tokagi | 428/141 |
| 4,985,881 | 1/1991 | Saito et al. | 369/13 |
| 5,132,173 | 7/1992 | Hashimoto | 428/336 |
| 5,418,076 | 5/1995 | Shiratori | 428/694 EC |
| 5,629,809 | 5/1997 | Shiratori | 369/13 |
| 5,629,909 | 5/1997 | Shiratori | 369/13 |
| 5,648,134 | 7/1997 | Shiratori | 428/641 |

FOREIGN PATENT DOCUMENTS

| | | |
|---|---|---|
| 0 618 572 A2 | 10/1994 | European Pat. Off. . |
| 6290406 | 10/1994 | Japan . |
| 6290496 | 10/1994 | Japan . |

OTHER PUBLICATIONS

Patent Abstracts of Japan, Vol. 095, No. 009, Oct. 31, 1995 (with respect to JP 7–153126 of Jun. 16, 1995).
Patent Abstracts of Japan, Vol. 097, No. 003, March 31, 1997 (with respect to JP 8–306090 of Nov. 22, 1996).
Patent Abstracts of Japan, Vol. 096, No. 005, May 31, 1996 (with respect to JP 8–007361 of Jan. 12, 1996).
Database WPI, Derwent Publications Ltd., Class A89, AN 95–249165 (with respect to JP 7–153126, Jun. 16, 1995).
Database WPI, Derwent Publication Ltd., Class T03, AN 97–057595 (with respect to JP 8–306090, Nov. 22,1996).

*Primary Examiner*—Leszek Kiliman
*Attorney, Agent, or Firm*—Fitzpatrick, Cella Harper & Scinto

[57] ABSTRACT

A magneto-optical recording medium, in which a magnetic wall is displaced to thereby enlarge a magnetic domain so as to reproduce a micro magnetic domain representing information, that has a non-magnetic substrate, a magnetic layer laminated on the substrate, and a projection-recess portion representing information formed on the surface of the substrate. The direction of magnetization of the magnetic layer on the projection-recess portion and the direction of magnetization of the magnetic layer on a region other than the projection-recess portion are oriented oppositely to each other.

9 Claims, 2 Drawing Sheets

MAGNETO-OPTICAL RECORDING MEDIUM EXCLUSIVELY FOR REPRODUCTION, METHOD OF MANUFACTURING THE SAME AND METHOD OF REPRODUCING INFORMATION FROM THE MEDIUM

BACKGROUND OF THE INVENTION

1. Field of the Invention

This invention relates to a magneto-optical recording medium suitable as an information recording medium exclusively for reproduction, a method of manufacturing the same and a method of reproducing information from the magneto-optical recording medium.

2. Related Background Art

In recent years, attention has been paid to a magneto-optical disc as a high-density recording medium capable of rewriting. Demand for further enhancing the recording density of the magneto-optical disc to thereby provide a recording medium of large capacity has been increasing.

A linear recording density of an optical disc depends greatly on the laser wavelength $\lambda$ of a reproducing optical system and the numerical aperture NA of an objective lens, and as regards the spatial frequency during signal reproduction, the order of NA/$\lambda$ is the detectable limit. Accordingly, to realize high density in the conventional optical disc, it is necessary to shorten the laser wavelength $\lambda$ of the reproducing optical system and to increase the numerical aperture NA of the objective lens. However, improvement in the laser wavelength and the numerical aperture of the objective lens is limited. Therefore, several techniques of contriving the construction of a recording medium and a reading method and improving the recording density have been proposed.

For example, the inventors have proposed, in Japanese Laid-Open Patent Application No. 6-290496, a magneto-optical recording medium capable of reproducing signals of periods below the diffraction limit of light at a high speed without reducing the amplitude of a reproduction signal, and a method of and apparatus for reproducing the same. That is, according to the above-mentioned Japanese Laid-Open Patent Application No. 6-290496, the magneto-optical recording medium is a magneto-optical recording medium comprising at least first, second and third magnetic layers laminated in succession, and more particularly is a perpendicular magnetic recording medium characterized in that the first magnetic layer is a perpendicular magnetization film (displacement layer) which is relatively small in magnetic wall coercivity and great in the degree of displacement of the magnetic wall in the vicinity of the ambient temperature as compared with the third magnetic layer, the second magnetic layer comprises a magnetic layer (switching layer) lower in Curie temperature than the first magnetic layer and the third magnetic layer, and the third magnetic layer is an ordinary perpendicular magnetization film (memory layer) excellent in preserving the stability of a magnetic domain. The method of reproducing this magneto-optical recording medium is characterized by applying a light beam from the first magnetic layer side while moving it relative to said medium, forming on said medium a temperature distribution having a gradient relative to the movement direction of the spot of said light beam, making a part of said temperature distribution into a temperature area higher than the Curie temperature of the second magnetic layer to thereby displace the magnetic wall formed in the first magnetic layer, detecting a change in the plane of polarization of the reflected light of the light beam and reproducing recorded information.

However, according to said magneto-optical recording medium and the reproducing method therefor (Japanese Laid-Open Patent Application No. 6-290406), it has become possible to reproduce signals of periods below the diffraction limit of light at a high speed without reducing the amplitude of a reproduction signal, but the range to which this technique is applicable is limited to a magneto-optical recording medium capable of effecting both recording and reproduction. That is, it cannot yet be applied to a magneto-optical recording medium exclusively for reproduction.

On the other hand, the manufacture of an optical type information recording medium exclusively for reproduction is usually done by a method of using an original disc on which information is recorded by forming projections and recesses, and transferring the projections and recesses onto a plastic substrate. This method is very well suited for mass production. This magneto-optical recording medium exclusively for reproduction is widely used as a medium for distributing music information, movie information, software, etc., and the larger capacity thereof is desired.

SUMMARY OF THE INVENTION

Accordingly, it is the object of the present invention to provide a magneto-optical recording medium exclusively for reproduction of which the recording density can be enhanced by the use of an enlarging reproducing method utilizing the displacement of a magnetic wall or a magneto-optical recording medium having an area exclusively for said reproduction and a rewritable area, and to provide a method of manufacturing the medium and a method of reproducing information from the medium.

The above object is achieved by a magneto-optical recording medium in which a magnetic wall is displaced to thereby enlarge a magnetic domain and the reproduction of a minute magnetic domain indicative of information is effected, provided with:

a non-magnetic substrate;
 a magnetic layer laminated on said substrate; and
 a projection-recess portion indicative of information formed on the surface of said substrate;
 the direction of magnetization of said magnetic layer on said projection-recess portion and the direction of magnetization of said magnetic layer on the other region than said projection-recess portion being oriented oppositely to each other.

Also, the above object is achieved by a method of manufacturing said medium, provided with the steps of applying a magnetic field greater than an Hm to thereby orient the magnetization of said magnetic layer in one direction, and thereafter applying a magnetic field in a direction opposite to said magnetic field and smaller than said Hm and greater than an Hn to thereby cause the magnetization of the magnetic layer formed on the other region than said projection-recess portion to be oriented in the other direction, where the Hm is a value of coercive force of the magnetic layer formed on said projection-recess portion, and the Hn is a value of coercive force of the magnetic layer formed on a portion other than said projection-recess portion.

Also, the above object is achieved by a method of reproducing said medium, provided with the steps of:
 moving said medium,
 applying a light beam to said magnetic layer while moving it relative to said medium to thereby form on said medium a temperature distribution having a gradient relative to the movement direction of said light beam; and causing a magnetic wall to displace along said temperature distribution and detecting any change in the plane of polarization of the reflected light of said light beam based on the displacement of said magnetic wall, and reproducing information.

The invention will hereinafter be described in greater detail with respect to an embodiment thereof.

DESCRIPTION OF THE PREFERRED EMBODIMENTS

The invention will hereinafter be described in greater detail with reference to the drawings.

Figure 2:
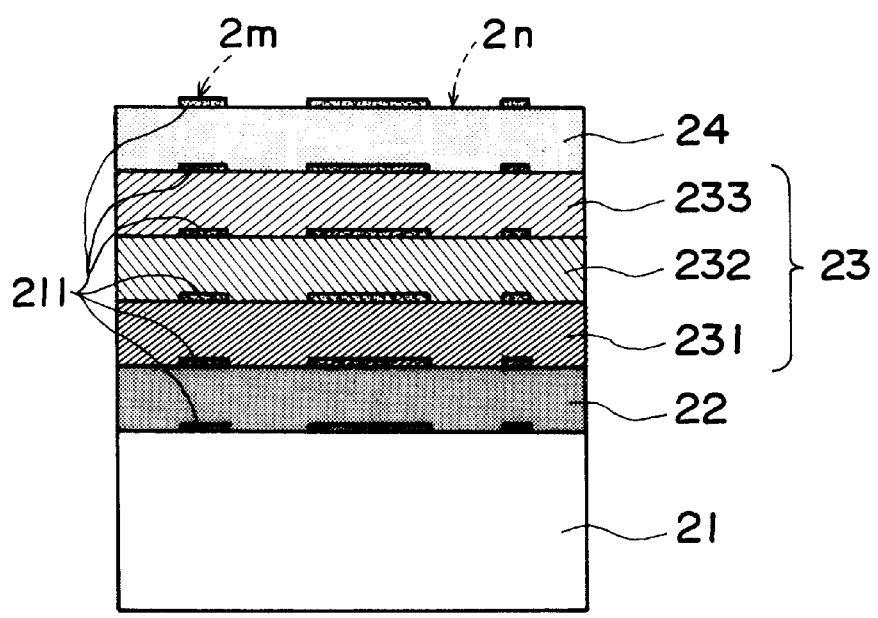
FIG. 2 is a typical cross-sectional view showing the layer construction of the magneto-optical disc of the present invention.

FIG. 2 is a cross-sectional view showing an embodiment of the magneto-optical recording medium of the present invention.

Figure 1A:
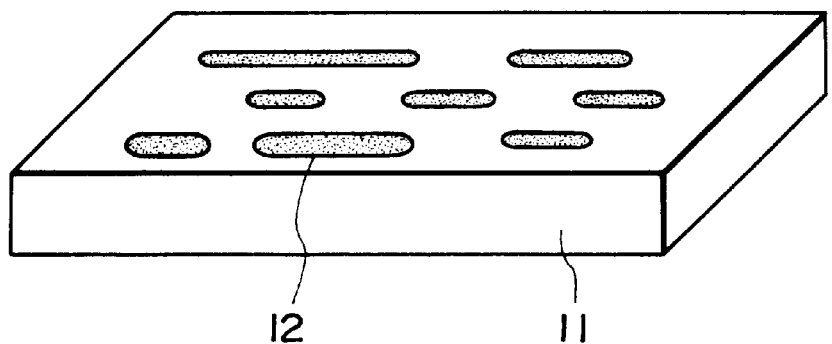
FIG. 1A is a fragmentary schematic perspective view of a stamper for manufacturing the magneto-optical disc of the present invention.
Figure 1C:
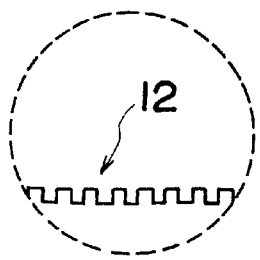
FIG. 1C is a fragmentary enlarged cross-sectional view of a projection-recess portion 12.
Figure 1B:
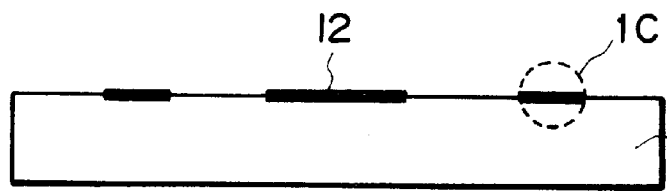
FIG. 1B is a side view of the stamper of FIG. 1A.

Information is recorded as a projection-recess portion 12 on the surface of a transparent substrate 21 formed by the stamper 11 of FIG. 1A. The sputter etching method is suitable as a method of forming the projection-recess portion 12 on the surface of the stamper 11. In FIGS. 1A to 1C, the cross-section of the projection-recess (recording mark) portion 12 is an aggregate of minute projections and recesses as enlargedly shown in FIG. 1C.

A first dielectric material layer 22, a magnetic layer 23 which is a recording layer, and a second dielectric material layer 24 are formed in succession on the transparent substrate 21.

As the transparent substrate 21, use can be made, for example, of glass, polycarbonate, polymethyl methacrylate, resin of the thermoplastic norvolnen origin or the like.

The size of the projection-recess change of the projection-recess portion 12 formed on the transparent substrate 21 may preferably be sufficiently small to a degree that will not hamper the reading-out of other information signals and will not cause an increase in noise, and specifically, may preferably be of the order of 50 angstroms as Ra (10-point average roughness).

The recording layer 23 has a three-layer construction as shown in Japanese Laid-Open Patent Application No. 6-290496. That is, a first magnetic layer 231 is a magnetic layer (a displacement layer and a reproduction layer) that is relatively small in magnetic wall coercivity in the vicinity of the ambient temperature and great in the degree of displacement of magnetic wall as compared with the third magnetic layer. A second magnetic layer 232 comprises a magnetic layer (switching layer) lower in Curie temperature than the first magnetic layer and the third magnetic layer, and the third magnetic layer 233 is an ordinary magnetic recording layer (memory layer) that is excellent in the preserving the stability of a magnetic domain.

The material of the magnetic layer 231 may preferably be, for example, a rare earth-iron family amorphous alloy of the GdCo system, the GdFe system, the GdFeCo system, the TbCo system or the like which is relatively small in magnetic anisotropy or a material for bubble memory such as garnet. By "iron family" is meant the elements iron, cobalt, and nickel.

The magnetic layer 232 may preferably be a magnetic layer of an alloy of the Co system or the Fe system and lower in Curie temperature than the magnetic layer 231 and the magnetic layer 233 and smaller in the value of saturation magnetization than the magnetic layer 233. For example, Curie temperature is adjustable by the amount of addition of Co, Cr, Ti or the like. The Curie temperature of the first magnetic layer 231 may preferably be within the range of 150° C. to 250° C.; the Curie temperature of the second magnetic layer 232 may preferably be within the range of 30° C. to 200° C.; and the Curie temperature of the third magnetic layer 233 may preferably be within the range of 200° C. to 350° C.

The material of the magnetic layer 233 may preferably be a material which is great in the values of saturation magnetization and perpendicular magnetic anisotropy, and of which the magnetized state (magnetic domain) can be held stably, such as a rare earth-iron family amorphous alloy such as TbFeCo, DyFeCo, TbDyFe or Co, or platinum family-iron family periodic structure film of Pt/Co, Pd/Co or the like. By "platinum family" is meant the elements Ru, Rh, Pd, Os, Ir and Pt.

The material of the first and second dielectric material layers is not particularly restricted, but yet may preferably be SiN.

The difference in the surface state of the substrate, i.e., whether the surface of the substrate is a minute projection-recess surface or a smooth surface (a non-mark portion), directly affects the crystal growth state of the film of the magnetic layer 23, and film of a different magnetic characteristic grows. Generally, the coercive force of the magnetic layer formed on the minute projection-recess surface tends to become greater than that of the magnetic layer formed on the smooth surface. This is because the smoother the surface of the substrate is, the more reduced is the pinning force.

It is possible to utilize this difference in the coercive force to magnetize a mark portion and a non-mark portion in opposite directions. That is, the information recorded on the substrate 21 can be transferred as the information of the direction of magnetization to the recording layer 23. A method of reproducing this information may be the method disclosed in Japanese Laid-Open Patent Application No. 6-290496, i.e., a method of applying a light beam to a magnetic layer to thereby impart a temperature gradient, and displacing the magnetic wall of the displacement layer to thereby reproduce signals of periods below the diffraction limit of light at a high speed.

As a preferred embodiment of the magneto-optical recording medium of the present invention, a first dielectric material layer, a magnetic layer which is a recording layer, and a second dielectric material layer are formed on a non-magnetic transparent substrate in the named order. On the surface of the non-magnetic transparent substrate, information is represented by a mark portion which is an aggregate of minute projections and recesses and a smooth non-mark portion. The shape of projections and recesses on the mark portion of the surface of the substrate is reflected to a surface shape of the first dielectric material layer thereon. The surface shape of the first dielectric material layer is reflected in a change in the coercive force of the recording layer thereon, and for example, in the recording layer, the portion located at the mark portion is relatively large in coercive force and the non-mark portion is relatively small in coercive force.

The present invention will hereinafter be described in greater detail with respect to some specific embodiments thereof, but the present invention is not restricted to the following embodiments as far as it does not exceed the gist thereof.

<Embodiment 1>

FIG. 1A is a fragmentary schematic view of a stamper which has manufactured the magneto-optical recording medium of the present invention, and FIG. 2 is a cross-sectional view of the magneto-optical recording medium of the present invention.

A minute projection-recess portion 12 was formed on the surface of the stamper 11 of FIGS. 1A to 1C by sputter etching. By the use of this stamper 11, the projection-recess portion 12 was transferred as a projection-recess portion 211 to the surface of a polycarbonate substrate. The surface difference (i.e. difference in height) between the projection and the recess in the projection-recess portion 211 was 50 angstroms in terms of Ra.

On the polycarbonate substrate 21, SiN layer 22 which is an interference layer was formed to 80 nm, and then GdFeCo layer 231 as a first magnetic layer (magnetic wall displacement layer) was formed to 30 nm, DyFe layer 232 as a second magnetic layer (switching layer) was formed to 10 nm, and TbFeCo layer 233 as a third magnetic layer (memory layer) was formed to 40 nm, all by sputtering. Lastly, SiN layer 24 as a protective layer was formed to 80 nm. The magnetic layers 23 are magnetically separated from one another between information tracks by an annealing process.

An external magnetic field is applied at two stages to a magneto-optical disc provided in this manner. The magneto-optical disc first passes through a strong external magnetic field $H_1$ perpendicular to the film surface, and then passes through a reverse magnetic field $H_2$ in the opposite direction while being moved. When the holding force of a recording mark portion $2_m$ at room temperature is $H_m$ and that of a non-mark portion $2_n$ is $H_n$, they are chosen such that $H_1 > H_m > H_2 > H_n$.

When the magneto-optical disc passes through the magnetic field $H_1$, the mark portion $2_m$ and the non-mark portion $2_n$ are both magnetized in the direction of the magnetic field $H_1$. Next, when the magneto-optical disc passes through the reverse magnetic field $H_2$, only the direction of magnetization of the non-mark portion $2_n$ which is small in the coercive force is reversed to the direction of the second magnetic field $H_2$, and the direction of magnetization of the mark portion $2_m$ which is great in the coercive force does not change. Thus, the mark portion $2_m$ and the non-mark portion $2_n$ are magnetized in opposite directions. That is, information formed on the surface of the substrate 21 by the projection-recess portion 211 is transferred to the magnetic layer 23 and is held thereon.

When the disc of high density exclusively for reproduction provided in this manner was reproduced by the use of an enlarging reproducing method (see Japanese Laid-Open Patent Application No. 6-290496) utilizing the displacement of magnetic wall which was already proposed by the inventors, a sufficient reproduction signal in the shortest bit length of 0.10 μm was obtained in an optical system of a wavelength 680 nm and NA 0.55.

<Embodiment 2>

Figure 3:
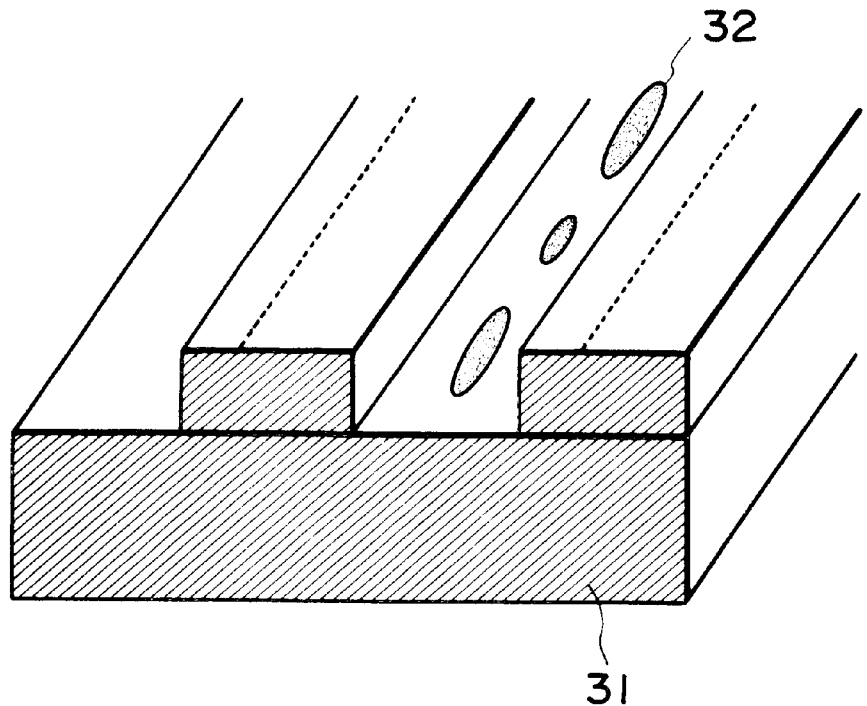
FIG. 3 is a fragmentary schematic perspective view showing another example of the stamper for manufacturing the magneto-optical disc of the present invention.
Figure 4:
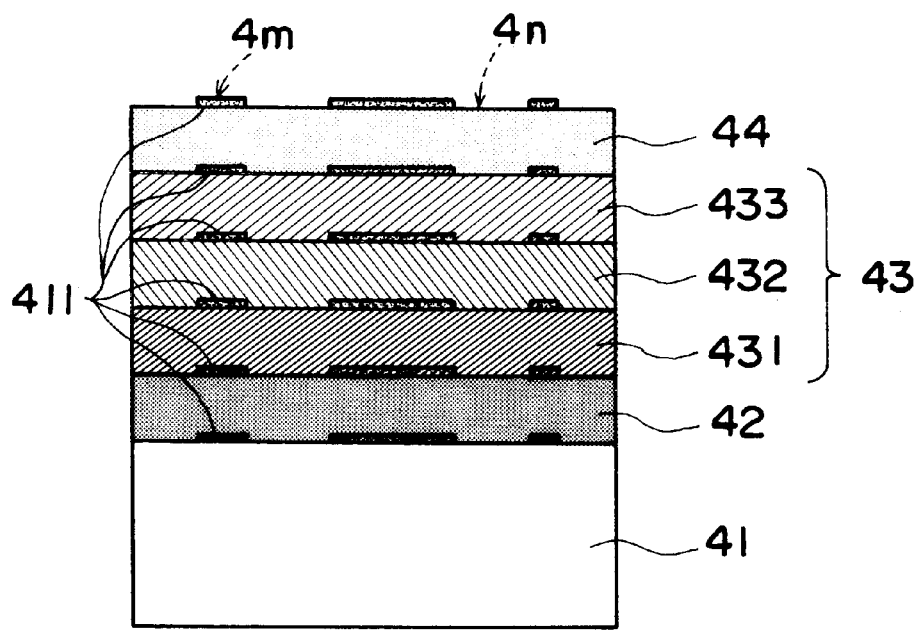
FIG. 4 is a typical cross-sectional view showing the layer construction of the optical disc of the present invention.

FIG. 3 is a fragmentary schematic cross-sectional view of a stamper which has manufactured the magneto-optical recording medium of the present invention, and FIG. 4 is a cross-sectional view of the magneto-optical recording medium of the present invention.

A minute projection-recess portion 32 was formed on the surface of the stamper 31 of FIG. 3 by sputter etching. A minute projection-recess portion 411 was transferred to the track surface of a polycarbonate substrate 41 formed by the use of the stamper 31. The surface difference (i.e. difference in height) between the projection and the recess in the projection-recess portion was 50 angstroms in terms of Ra. The projection-recess portion 411 is defined as the ID information recording portion of the magneto-optical disc of the present invention. The magneto-optical disc of the present invention is a magneto-optical disc of the conventional type capable of recording and reproducing, and the ID information thereof is realized by the minute projection-recess portion.

As in Embodiment 1, on the polycarbonate substrate having the minute projection-recess portion, SiN layer 42 which is an interference layer was formed to 80 nm, and then GdFeCo layer 431 as a first magnetic layer (magnetic wall displacement layer) was formed to 30 nm, DyFe layer 432 as a second magnetic layer (switching layer) was formed to 10 nm, and TbFeCo layer 433 as a third magnetic layer (memory layer) was formed to 40 nm, all by sputtering. Lastly, SiN layer 43 as a protective layer was formed to 80 nm. The magnetic layer 43 is magnetically separated between information tracks by the level difference of a guide groove.

As in Embodiment 1, an external magnetic field was applied at two stages to the magneto-optical disc provided in this manner, to thereby form an ID information recording portion in which a mark portion $4m$ and a non-mark portion $4n$ were magnetized in opposite directions.

When the ID information of the magneto-optical disc of super-high density provided in this manner was reproduced by the use of the enlarging reproducing method (see Japanese Laid-Open Patent Application No. 6-290496) utilizing the displacement of magnetic wall which was already proposed by the inventors, a sufficient reproduction signal in the shortest bit length of 0.15 μm was obtained in an optical system of a wavelength 680 nm and NA 0.55. That is, the ID information portion of the magneto-optical disc of super-high density could be recorded/reproduced at recording density equal to that of a data information portion.

According to the present invention, in the case of the manufacture of the magneto-optical recording medium of the present invention, use can be made of the conventional method of transferring the projections and recesses of the original disc of the stamper to a substrate by stamping. Therefore, the magneto-optical recording medium of the present invention can be easily mass-produced and is suitable as a medium exclusively for reproduction or a rewritable medium partially having information such as address information.

In the magneto-optical recording medium of the present invention, the recording layers can be magnetized in different directions depending on the location by the utilization of the difference in coercive force between the recording layers. That is, the projection-recess information of the base member can be transferred as magnetization direction information to the recording layer. When information is represented as the direction of magnetization of the recording layer, this information can be reproduced by an enlarging reproducing method utilizing the displacement of magnetic wall.

What is claimed is:

1. A magneto-optical recording medium in which a magnetic wall is displaced to thereby enlarge a magnetic domain so as to reproduce a micro magnetic domain representing information, comprising:

a non-magnetic substrate;

a magnetic layer laminated on said substrate; and a projection-recess portion representing information formed on the surface of said substrate, wherein the direction of magnetization of said magnetic layer on said projection-recess portion and the direction of magnetization of said magnetic layer on a region other than said projection-recess portion are oriented oppositely to each other.

2. A magneto-optical recording medium according to claim 1, wherein said magnetic layer comprises a first magnetic layer, a second magnetic layer and a third magnetic layer from said substrate side, said first magnetic layer having a smaller magnetic wall coercivity and a greater degree of magnetic wall displacement than said third magnetic layer at a temperature in the vicinity of the ambient temperature, said second magnetic layer having a lower Curie temperature than said first magnetic layer and said third magnetic layer, and said third magnetic layer having a large perpendicular magnetic anisotropy.

3. A magneto-optical recording medium according to claim 1, wherein the coercive force $H_m$ of said magnetic layer formed on said projection-recess portion is greater than the coercive force $H_n$ of the region other than said projection-recess portion.

4. A magneto-optical recording medium according to claim 1, which is a medium exclusively for reproduction and wherein said projection-recess portion is formed on the whole surface of said substrate.

5. A magneto-optical recording medium according to claim 1, wherein said projection-recess portion is formed on only an ID information portion.

6. A method of manufacturing the medium of claim 3 comprising the steps of:

applying a first magnetic field greater than said $H_m$ to thereby orient the magnetization of said magnetic layer in one direction; and thereafter applying a second magnetic field in a direction opposite to said first magnetic field and smaller than said $H_m$ and greater than said $H_n$ to thereby cause the magnetization of said magnetic layer formed on the region other than said projection-recess portion to be oriented in a direction opposite to the one direction.

7. A method according to claim 6, further comprising the step of magnetically separating said magnetic layer between information tracks by a level difference of a guide groove.

8. A method of reproducing the medium of claim 1 comprising the steps of:

moving said medium;

applying a light beam to said magnetic layer while moving said light beam to thereby form on said medium a temperature distribution having a gradient in the movement direction of said light beam; and causing a magnetic wall to displace along said temperature distribution and detecting any change in the plane of polarization of the reflected light of said light beam based on the displacement of said magnetic wall, and reproducing the information.

9. A medium according to claim 2, wherein said first magnetic layer, said second magnetic layer and said third magnetic layer are separated from one another between information tracks by an annealing process.

* * * * *